United States Patent [19]

Asawa et al.

[11] 4,340,680
[45] Jul. 20, 1982

[54] CATION EXCHANGE MEMBRANE OF FLUORINATED POLYMER FOR AN ELECTROLYSIS

[75] Inventors: Tatsuro Asawa, Yokohama; Masaaki Yamabe, Machida; Haruhisa Miyake, Yokohama, all of Japan

[73] Assignee: Asahi Glass Company, Limited, Tokyo, Japan

[21] Appl. No.: 171,286

[22] Filed: Jul. 23, 1980

[30] Foreign Application Priority Data

Aug. 14, 1979 [JP] Japan .................. 54-102750

[51] Int. Cl.$^3$ .................................. B01J 47/12
[52] U.S. Cl. ................................ 521/27; 521/31
[58] Field of Search ........................ 521/27, 31

[56] References Cited

U.S. PATENT DOCUMENTS 4,151,053 4/1979 Seko et al. .................. 521/29

FOREIGN PATENT DOCUMENTS 52-24177 2/1977 Japan ...................... 521/27

Primary Examiner—William F. Hamrock
Assistant Examiner—Peter F. Kulkosky
Attorney, Agent, or Firm—Oblon, Fisher, Spivak, McClelland & Maier

[57] ABSTRACT

A cation exchange membrane of a fluorinated polymer for an electrolysis comprises a structure of a copolymer of a fluorinated olefin and a fluorovinyl compound having the formula

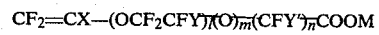

$$CF_2=CX-(OCF_2CFY)_l(O)_m(CFY')_n COOM$$

wherein X represents —F or —CF$_3$; Y and Y' respectively represents —F or a C$_1$–C$_{10}$ perfluoroalkyl group; l is 0 to 3; m is 0 or 1; n is 0 to 12 and M represents hydrogen atom or an alkali metal atom; and a modified surface layer of said cation exchange membrane in an anode side which has —SO$_3$M groups formed by converting —COOM groups.

7 Claims, No Drawings

CATION EXCHANGE MEMBRANE OF FLUORINATED POLYMER FOR AN ELECTROLYSIS

BACKGROUND OF THE INVENTION

1. Field of the Invention

The present invention relates to a cation exchange membrane of a fluorinated polymer for an electrolysis. More particularly, it relates to a cation exchange membrane of a fluorinated polymer which imparts high current efficiency and low electric resistance in an electrolysis of an aqueous solution of an alkali metal chloride.

2. Description of Prior Art

It has been proposed to use a cation exchange membrane of a fluorinated copolymer produced by copolymerizing a fluorinated olefin such as $CF_2=CF_2$ and a fluorovinyl ether having sulfonic acid group or a functional group being convertible to sulfonic group such as $CF_2=CFOCF_2CF(CF_3)OCF_2CF_2SO_2F$ and hydrolyzing the fluorinated copolymer to convert $-SO_2F$ groups into $-SO_3H$ groups, as a membrane for an electrolysis of an alkali metal chloride. (U.S. Pat. No. 4,025,405)

When the cation exchange membrane of the fluorinated copolymer is used as a membrane for an electrolysis of an alkali metal chloride, excellent acid resistance, chlorine resistance and alkali resistance are found, however it is difficult to maintain high current efficiency in a case of increasing a concentration of an alkali metal hydroxide as the product.

It has been proposed, in order to overcome such disadvantage, to improve the characteristics by converting sulfonic acid groups as the ion exchange groups of the cation exchange membrane of a fluorinated polymer into carboxylic acid groups by treating with a reducing agent or an oxidizing agent. (U.S. Pat. No. 4,151,053 and U.S. Pat. No. 4,200,711). The resulting modified cation exchange membrane has an ion exchange capacity of only upto about 0.9 meq./g. polymer because of high polarity of sulfonic acid group. It is difficult to obtain a cation exchange membrane having greater ion exchange capacity.

When sulfonic acid groups which provide small ion exchange capacity are converted into carboxylic acid groups, an electric resistance is higher. Therefore, only thin surface layer in a cathode side should be converted into carboxylic acid groups. When carboxylic acid groups contact with an aqueous solution of an alkali metal hydroxide having high concentration at high temperature for a long time, carboxylic acid groups are gradually decomposed. When the modified cation exchange membrane is continuously used, the desired characteristics are deteriorated. It is necessary to treat again the membrane so as to convert sulfonic acid groups into carboxylic acid groups. In order to convert sulfonic acid groups into carboxylic acid groups in the thin layer of the membrane so as to prevent the increase of the electric resistance it is necessary to take care of the operations and it is not easy to control the operations in an industrial work.

On the other hand, it has been proposed to use a cation exchange membrane of a fluorinated copolymer of a fluorinated olefin such as $CF_2=CF_2$ and a fluorovinyl ether having carboxylic acid group or a functional group being convertible to carboxylic acid group such as $CF_2=CFO(CF_2)_nCOOM$ wherein n is 1 to 12 and M represents hydrogen atom or an alkali metal atom, as a membrane for an electrolysis of an alkali metal chloride. (U.S. Pat. No. 4,065,366 and U.S. Pat. No. 4,202,743).

When such cation exchange membrane is used, a degree of dissociation of carboxylic acid groups is lowered to rise a cell voltage in an operation at low pH with an addition of an acid such as hydrochloric acid so as to control a concentration of oxygen in chlorine gas formed in an anode compartment.

SUMMARY OF THE INVENTION

It is an object of the present invention to provide a cation exchange membrane of a fluorinated polymer for an electrolysis which is different from the conventional cation exchange membrane of fluorinated polymers, to impart high current efficiency and low electric resistance in the electrolysis and to eliminate a retreatment for recovery from deterioration of characteristics.

It is another object of the present invention to provide a cation exchange membrane which is easily produced and can be used at low pH in an anode compartment.

The foregoing and other objects of the present invention have been attained by providing a cation exchange membrane of a fluorinated polymer for an electrolysis which comprises a structure of a copolymer of a fluorinated olefin and a fluorovinyl compound having the formula

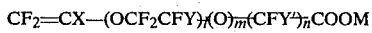

wherein X represents $-F$ or $-CF_3$; Y and Y' respectively represents $-F$ or a $C_1-C_{10}$ perfluoroalkyl group; l is 0 to 3; m is 0 or 1; n is 0 to 12 and M represents hydrogen atom or an alkali metal atom; and a modified surface layer of said cation exchange membrane in an anode side which has $-SO_3M$ groups formed by converting $-COOM$ groups.

DETAILED DESCRIPTION OF THE PREFERRED EMBODIMENTS

The fluorinated copolymer of the fluorinated olefin and the fluorovinyl compound having carboxylic acid group can be a polymer having a large ion exchange capacity such as upto 2.0 meq./g. dry polymer though it is difficult in the sulfonic acid type fluorinated copolymer. A cation exchange membrane of the fluorinated copolymer having such large ion exchange capacity has a low electric resistance. When a part of carboxylic acid groups in the anode side, are converted into sulfonic acid groups, the electric resistance can be further lowered. Since the electric resistance is lowered by the conversion, it is unnecessary to control precisely the ratio of the conversion into sulfonic acid groups in the surface layer. The control for the conversion can be easy and any retreatment is not needed. Moreover, the surface layer of the membrane in the anode side is converted into sulfonic acid groups, whereby the electric resistance of the membrane does not increase and the cell voltage does not increase even though an acid is added into the anode compartment to be a low pH.

The cation exchange membrane of the present invention has a structure of the copolymer of the fluorinated olefin and the fluorovinyl compound having carboxylic acid groups. Another copolymer can be used so long as it has such structure in an electrolysis of an aqueous solution of an alkali metal chloride. It is preferable to be a copolymer of the fluorinated olefin and a fluorovinyl compound having carboxylic acid or a functional group being convertible into carboxylic acid group.

The fluorovinyl compounds having carboxylic acid group or the functional group being convertible into carboxylic acid group have the formula $$CF_2=CX-(OCF_2CFY)_l(O)_m(CF_2Y')_nA$$

wherein X, Y, Y', l, m and n are defined above and A represents —COOM or a functional group which is convertible to —COOM by hydrolysis or neutralization, such as —CN, —COF, —COOR$_1$, —COOM$_1$ or —COONR$_2$R$_3$; R$_1$ represents a C$_{1-10}$ alkyl group; R$_2$ and R$_3$ respectively represent —H or R$_1$; M$_1$ represents a quaternary ammonium group.

From the viewpoints of the property and availability, it is preferable to use the fluorovinyl compound having the above-mentioned formula wherein X is —F; Y is —F or —CF$_3$; Y' is —F; l is 0 to 1; m is 0 to 1; n is 0 to 8; A is —COF or —COOR$_1$ from the viewpoint of the copolymerization reaction. It is preferable to use the fluorovinyl compound having the following formula $$CF_2=CF-(OCF_2CF)_pO-(CF_2)_qCOOM$$
$$\phantom{CF_2=CF-(OCF_2C}|$$
$$\phantom{CF_2=CF-(OCF_2CF}CF_3$$

wherein p is 0 or 1; q is 1 to 5 and M is defined above.

Typical fluorovinyl compounds include $$CF_2=CFO(CF_2)_{1-8}COOCH_3,$$

$$CF_2=CFO(CF_2)_{1-8}COOC_2H_5,$$

$$CF_2=CF(CF_2)_{1-8}COF,$$

$$CF_2=CFOCF_2CF(CF_3)OCF_2CF_2CF_2COOCH_3$$

The fluorinated olefins are preferably compounds having the formula $$CF_2=CZZ'$$

wherein Z and Z' respectively represent —F, —Cl, —H or —CF$_3$. It is preferable to use a tetrafluoroethylene, trifluorochloroethylene, hexafluoropropylene, trifluoroethylene, vinylidene fluoride and vinyl fluoride. It is optimum to use a perfluoroethylene such as tetrafluoroethylene.

In the process of the invention, it is possible to use two or more types of the functional fluorovinyl monomers and the fluorinated olefins, respectively.

It is also possible to add one or more other monomer such as a fluorovinyl ether having the formula $$CF_2=CFOR_f$$

wherein R$_f$ represents a C$_{1-10}$ perfluoroalkyl group; and a divinyl monomer e.g. CF$_2$=CF—CF=CF$_2$ and CF$_2$=CFO(CF$_2$)$_{1-4}$OCF=CF$_2$.

A content of the specific fluorovinyl component is important since it highly relates to the characteristics of the cation exchange membrane and it is selected so as to give an ion exchange capacity of preferably 0.9 to 4.0 meq./g. dry polymer especially 1.1 to 2.0 meq./g. dry polymer. When it is too small, the ion exchange function is too low and the electric resistance is too high. On the other hand, when it is too much, the mechanical strength of the cation exchange membrane is not high enough and a water content is too large so as to be inferior electric characteristics such as current efficiency.

The copolymerization of the fluorinated olefin and the specific fluorovinyl compound can be carried out with or without an inert organic solvent or aqueous medium in the presence of a polymerization initiator such as a peroxy compound, an azo compound or an irradiation of ultraviolet ray or an ionized radioactive ray by the known processes such as the processes disclosed in U.S. Pat. Nos. 4,116,888 and 4,138,373. The polymerization can be a bulk polymerization, a solution polymerization, a suspension polymerization and an emulsion polymerization.

In the production of the fluorinated copolymer of the present invention, one or more of the fluorovinyl compound and one or more of the fluorinated olefin if desired, one or more of the other comonomer can be copolymerized.

The fluorinated copolymer used for the present invention has preferably T$_Q$ (a temperature for a melt volumetric flow rate of 100 mm$^3$/second) of 130° to 350° C. especially 160° to 300° C. (which relates to the molecular weight).

The fluorinated copolymer can be fabricated to obtain a cation exchange membrane by the known processes such as a press-molding process; a roll-molding process; an extrusion-molding process; a solution-spreading process; a dispersion-molding process and a powder-molding process.

The membrane should be non-porous and dense so as to be high ion selectivity of the cation exchange membrane. A water permeability of the membrane is preferably less than 100 ml./hr./m$^2$ especially less than 10 ml./hr./m$^2$ under a pressure of 1 mH$_2$O (60° C.; pH=1.00; 4 N–NaCl). A thickness of the membrane is preferably in a range of 10 to 500μ especially 50 to 300μ.

When the fluorinated copolymer has not carboxylic acid groups but has functional groups being convertible into carboxylic acid groups, the copolymer is before or after the fabrication preferably, the functional groups are converted into carboxylic acid groups by a suitable treatment. For example, when the functional groups are acid ester groups, acid amide groups, or quaternary ammonium salt groups, the copolymer is hydrolyzed or neutralized in an alcoholic solution of an acid or a base to convert the functional groups into carboxylic acid groups.

When the copolymer is fabricated into the cation exchange membrane, it is possible to blend an olefin polymer such as polyethylene and polypropylene or a fluorinated polymer such as polytetrafluoroethylene and copolymer of ethylene and tetrafluoroethylene. It is also possible to support the fluorinated polymer on a supporter such as woven fabrics nets, nonwoven fabrics and porous films made of such olefin polymer or fluorinated polymer.

The process for converting carboxylic acid groups in the surface layer of the carboxylic acid type cation exchange membrane in the anode side into sulfonic acid group is not critical and can be selected from various processes. For example, the following reaction can be carried out for the cation exchange membrane made of a copolymer having —(CF$_2$)$_2$COOM' (M' represents a lower alkyl group) as branched chains.

The ester groups of copolymer are hydrolyzed in an aqueous solution of a base to form the branched chains having the formula $$-(CF_2)_2COOM''$$

(M'' represents an alkali metal atom) and then, further converted into $-CF=CF_2$ groups by a decarbonation reaction and then, further converted into sulfonic acid groups by reacting with sulfuryl fluoride and hydrolyzing them.

The $-(CF_2)_2COOM''$ groups are converted into $-CF_2CF_2H$ groups by treating the copolymer in a conc. alkaline metal hydroxide solution at high temperature and then further converted into sulfonic acid groups by reacting with chlorosulfonic acid as well as the complex of sulfur trioxide with pyridine or dioxane.

The $-(CF_2)_2COOM''$ groups of the copolymer are converted into $-(CF_2)_2COOH$ groups and then converted into $-(CF_2)_2I$ groups by reacting with iodine in the presence of a peroxide and then converted into $-(CF_2)_2MgBr$ or $-(CF_2)_2Li$ groups by reacting with Grignard reagent or alkyl lithium, respectively and then converted into $-(CF_2)_2SO_2Cl$ by reacting with sulfonyl chloride. $-(CF_2)_2I$ groups can be also converted directly into $-(CF_2)_2SO_2Cl$ by sulfur trioxide and chlorine in the presence of zinc. $-(CF_2)_2SO_2Cl$ groups are further converted into sulfonic acid groups by hydrolyzing them.

The surface layer of the membrane in the anode side in which the $-COOM$ groups are converted into $-SO_3M$ groups can be a thin layer having a depth of preferably at least $1.0\mu$ especially in a range of 5.0 to $100\mu$ and upto about ⅓ of the thickness of the membrane in view of improved effect of electrochemical properties.

A process for treating only one surface, can be various processes, for example, the other surface is protected by a desired film before the treatment or two sheets of the membranes are overlapped and sealed at the peripheral part before the treatment.

The resulting cation exchange membrane of a fluorinated polymer of the present invention can be used for an electrolysis of an aqueous solution of an alkali metal chloride to produce an alkali metal hydroxide and chlorine. It is also possible to use it in an electrolysis of alkali carbonate, alkali sulfate or water. The system and apparatus for the electrolysis can be desired electrolytic system including (Solid Polymer Electrolyte) SPE in which the membrane is brought into contact with the electrodes.

A further understanding can be obtained by reference to certain specific examples which are provided herein for purposes of illustration only and are not intended to be limiting unless otherwise specified.

EXAMPLE 1

A copolymer having an ion exchange capacity of 1.47 meq./g. polymer and $T_Q$ of 235° C. was produced by copolymerizing $CF_2=CF_2$ and $CF_2=CFO(CF_2)_3COOCH_3$ in a bulk polymerization at 65° C. with azobisisobutyronitrile as an initiator. The copolymer was fabricated to form a film having a thickness of $300\mu$ by a press-molding, at 235° C. Two sheets of the film were overlapped and peripheral parts were sealed with a packing made of polytetrafluoroethylene and the films were dipped into 25 wt.% aqueous solution of sodium hydroxide at 90° C. for 1 hr. The films were washed with water and heat-treated in an electric oven at 250° C. The films were dipped into a tetraglyme solution of cesium fluoride at 70° C. for 5 hr. to form sulfuryl fluoride. The films were taken up and the sealed part was opened to separate them into two sheets of membrane. Each membrane was dipped into 25 wt. % aqueous solution of sodium hydroxide at 90° C. for 16 hr. Both surfaces of the membrane were observed by a surface infrared spectrography. On the treated surface, the absorption of $-SO_3Na$ group at 1060 cm$^{-1}$ was found and on the non-treated surface, the absorption of $-COONa$ group at 1680 cm$^{-1}$ was found.

According to a measurement of XMA for sulfur in the sectional direction of the membrane, it was confirmed that the surface layer of $SO_3Na$ groups reached to a depth of $10\mu$ from the surface.

A two compartment cell was assembled with the cation exchange membrane having the surface layer of $-SO_3Na$ groups in an anode side to use it for an electrolysis.

A ruthenium oxide coated titanium electrode was used as an anode and a stainless steel electrode was used as a cathode and a distance between the electrodes was set in 2.2 cm and an effective area of the membrane was 25 cm$^2$. An electrolysis of an aqueous solution of sodium chloride was carried out in the following condition.

4 N—NaCl aqueous solution was charged into an anode compartment and 8 N—NaOH aqueous solution was charged into a cathode compartment. An electrolysis was carried out by feeding 4 N—NaCl aqueous solution into the anode compartment at a rate of 150 cc/hr. and feeding 0.1 N—NaOH aqueous solution into the cathode compartment at a rate of 2.7 cc/hr., and a current density of 20 A/dm$^2$, at 92° C. under maintaining pH of the anolyte to 1.2 by adding hydrochloric acid into the anode compartment so as to decrease a concentration of oxygen in chlorine gas to less than 1.5%.

The aqueous solution of sodium chloride was overflowed from the anode compartment and the aqueous solution of sodium hydroxide overflowed from the cathode compartment was collected. A current efficiency was measured by the amount of the resulting sodium hydroxide.

As a result of the electrolysis, 40 wt. % of sodium hydroxide was obtained at a current efficiency of 94% and a cell voltage of 3.5 V. The membrane maintained stable characteristics in the operation for long time.

On the other hand, the same electrolysis was carried out under the addition of hydrochloric acid into the anode compartment by using the non-treated membrane in which the conversion of the surface layer into $-SO_3Na$ groups in the anode side is not made. The cell voltage increased to 4.3 V.

EXAMPLE 2

A film having a thickness of $300\mu$ was prepared by pressmolding the fluorinated copolymer by the process of Example 1. Two sheets of the film were overlapped and the peripheral parts were sealed and dipped into 50 wt. % of aqueous solution of sodium hydroxide at 120° C. for 40 hr. The films were washed with water and treated with chlorosulfonic acid. The two sheets of the treated film were separated into two membranes. Each membrane was treated in 25 wt. % aqueous solution of sodium hydroxide at 90° C. for 16 hr.

According to the surface infrared spectrography, it was found that one surface layer of the membrane had —SO₃Na group and the other surface layer had —COONa groups.

According to the observation of XMA for sulfur, a depth of the surface layer having —SO₃Na groups was 25μ.

In accordance with the process of Example 1 except using the resulting membrane, an electrolysis was carried out by adding hydrochloric acid into the anode compartment so as to maintain a concentration of oxygen to less than 1.5%. The pH in the anode compartment was 1.0.

As a result of the electrolysis, 40 wt. % aqueous solution of sodium hydroxide was produced in stable for a long time at a cell voltage of 3.5 V. When a non-treated cation exchange membrane in which a conversion to —SO₃Na groups is not made, was used in the same electrolysis, a cell voltage was 4.6 V. The same reaction procedure as described above was applied for a film prepared by pressmolding the fluorinated copolymer of $CF_2=CF_2$ and $CF_2=CFOCF_2COOCH_3$ which was polymerized in bulk at 45° C. using diisopropyl peroxydicarbonate as an initiator and had an ion exchange capacity of 1.45 meq./g. and $T_Q$ of 230° C. From the surface infrared and XMA measurements, it was confirmed that one surface of the membrane had —SO₃Na groups and their depth was 20μ.

EXAMPLE 3

A copolymer having an ion exchange capacity of 1.37 meq./g. polymer and $T_Q$ of 210° C. was produced by copolymerizing $CF_2=CF_2$ and $CF_2=CFO(CF_2)_3COOCH_3$ and

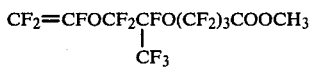

(ratio of 80:20) in a bulk polymerization at 65° C. with azobisisobutyronitrile as an initiator. The copolymer was fabricated to form a film having a thickness of 300μ by a press-molding at 210° C. Two sheets of the film were overlapped and peripheral parts were sealed with a packing made of polytetrafluoroethylene and the films were dipped into 25 wt. % aqueous solution of sodium hydroxide at 90° C. for 1 hr. and then dipped into conc. HCl at 90° C. for 1 hr. The films were washed with water and dried and dipped into 1,2-difluoro-1,1,2,2-tetrachloroethane at 90° C. for 1 hr. to highly swell the surface. After cooling it, iodine and benzoylperoxide were added and the reaction system was kept at 90° C. for 5 hr. The films were washed with methanol and dried.

According to the surface infrared spectrography, it was confirmed that carboxylic acid groups were converted into CF₂I groups by the absorption at 760 cm⁻¹.

The films were dipped into a tetrahydrofuran solution of C₆H₅MgBr at −70° C. for 5 hr. and then at −40° C. for 2 hr. The solution was further cooled at −70° C. and admixed with excess of SO₂Cl₂ and was heated from −70° C. to the ambient temperature during 24 hours. The films were taken up and washed with a dilute hydrochloric acid and with water and were separated into two membranes. Each membrane was dipped into 25 wt. % aqueous solution of sodium hydroxide at 90° C. for 16 hr. According to the surface infrared spectrography of the membrane, it was confirmed that the treated surface layer had —SO₃Na groups and the other surface layer had —COONa groups.

We claim:

1. A cation exchange membrane of a fluorinated polymer for an electrolysis which comprises a structure of a copolymer of a fluorinated olefin and a fluorovinyl compound having the formula:

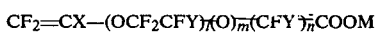

wherein

X represents —F or —CF₃;

Y and Y' respectively represents —F or C₁-C₁₀ perfluoroalkyl group;

l is 0 to 3;

m is 0 or 1;

n is 0 to 12 and M represents hydrogen atom or an alkali metal atom; and one modified surface layer of said cation exchange membrane on an anode side which has —SO₃M groups formed from —COOM groups of said copolymer, wherein said modified surface layer does not extend to more than ⅓ the thickness of said membrane.

2. The cation exchange membrane according to claim 1 wherein said fluorovinyl compound is a compound having the formula

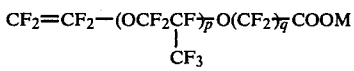

wherein p is 0 or 1; q is 1 to 5 and M represents hydrogen atom or an alkali metal atom.

3. The cation exchange membrane according to claim 1 or 2 wherein said cation exchange membrane has a modified surface layer having —OCF₂SO₃M groups on an anode side and a surface layer having —OCF₂COOM groups on a cathode side.

4. The cation exchange membrane according to claim 1, wherein said surface layer of said cation exchange membrane on an anode side has —SO₃M groups as ion-exchange groups to a depth of at least 1.0μ.

5. The cation exchange membrane according to claim 1, wherein the ion exchange capacity of —SO₃M groups in said modified surface layer is in the range of 1.0 to 4.0 meq./g. dry polymer.

6. The cation exchange membrane according to claim 1, wherein —COOM groups are converted into —SO₃M groups through intermediate groups of —CF=CF₂, —CF₂H or —CF₂I.

7. The cation exchange membrane according to claim 1, wherein said electrolysis is an electrolysis of an aqueous solution of an alkali metal chloride to produce an alkali metal hydroxide and chlorine.

* * * * *